Sept. 23, 1952     O. E. HINTZ ET AL     2,611,603
MECHANICAL GOVERNOR WITH SPRING SUPPORTED
WEDGE SHAPED GOVERNOR WEIGHTS
Filed Sept. 30, 1948

Inventors:
Otto E. Hintz
Howard A. Heckendorf
Paul O. Pippel
Atty.

Patented Sept. 23, 1952

2,611,603

UNITED STATES PATENT OFFICE 2,611,603

MECHANICAL GOVERNOR WITH SPRING SUPPORTED WEDGE SHAPED GOVERNOR WEIGHTS

Otto E. Hintz and Howard A. Heckendorf, Chicago, Ill., assignors to International Harvester Company, a corporation of New Jersey Application September 30, 1948, Serial No. 51,958

2 Claims. (Cl. 264—18)

This invention relates to a mechanical governor. More particularly, this invention relates to a governor adapted to control the speed of electric motors.

The use of high-speed electric motors has become extremely popular in the field of appliances and other mechanisms where high-speed rotation of operation is desirable. By directly connecting the mechanism to be driven to the shaft of the electric motor, high speeds of operation have been accomplished with a minimum of expense and with satisfactory results. This is especially true in the field of cream separators where a separating bowl must be driven at extremely high speeds of rotation. The direct drive from a high-speed electric motor was found to be desirable. In connection with this type of mechanism, however, it was discovered that constant speeds of rotation were exceedingly difficult to maintain without the use of an adequate and positive governing device. Inherent current fluctuations, load variations and wear within the motor were responsible for numerous speed variations which, of course, would have undesirable effects on the separation of the material. Most mechanical governors were found to be unsatisfactory since the number of moving parts made it necessary to have constant service, lubrication, and other attention by the operator. The governing tolerances within which ordinary governors operated were difficult to determine since the inherent friction of the governor could not be adequately calculated. Fluid-type governors generally would be effected by atmospheric changes and thus magnify rather than diminish the speed variations which might occur in the operation of the electric motor. Applicants have developed a novel type of mechanical governor adapted for use with an electric motor. A prime object of their invention is to provide a mechanical governor for a high-speed motor, the mechanical governor including a design having its component parts arranged to eliminate to a maximum degree the friction ordinarily found within a mechanical governing device.

Still another object is to provide a governor for use with a high-speed electric motor, said governor being constructed to eliminate to the greatest possible extent the speed variations of the motor.

Another object is to provide an improved mechanical governor that may operate over long periods of time without service and without the need of continual maintenance and lubrication.

Still another object is to provide a mechanical governor adapted for use with an electrical motor, said governor including a pair of governor weights which are pivoted on a knife edge thereby providing for a minimum of friction, said governor weights being arranged to be swung outwardly and inwardly on the knife edge, thereby reciprocating a plunger arranged to control the flow of electrical energy to the motor.

These and other objects will become more readily apparent upon the reading of the specification when examined in connection with the drawing.

Figure 1:
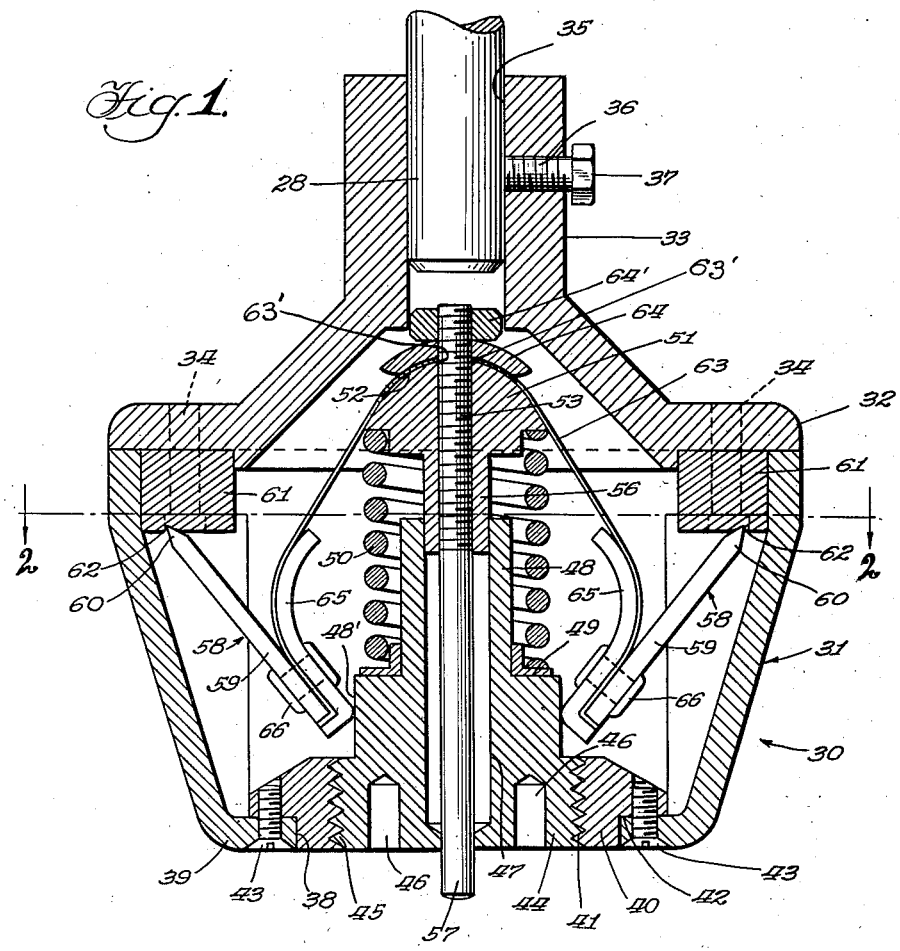
Fig. 1 is a sectional view through an improved governor.
Figure 2:
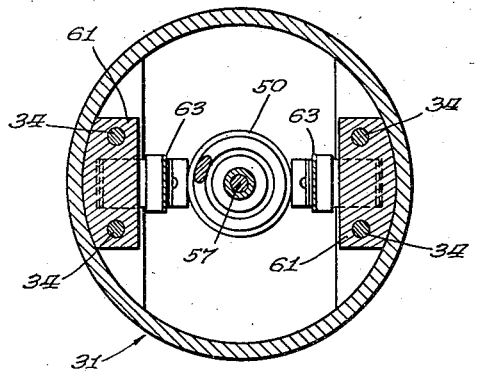
Fig. 2 is a sectional view taken along the line 2—2 of Fig. 1.

Referring particularly to Fig. 1, a lower armature shaft 28 extends downwardly from an electric motor or power unit (not shown).

A speed governor, which is connected to the shaft 28, is generally designated by the reference character 30. The speed governor 30 includes a casing 31. The casing 31 comprises a cover 32 having an upwardly extending centrally disposed connecting collar 33. The cover 32 may be connected to the casing 31 by means of screws 34. The connecting collar 33 includes a central bore 35 which is adapted to be placed in telescoping engagement with the lower armature shaft 28. The collar 33 also includes a transverse threaded bore 36 within which is threaded a lock screw 37 adapted to rigidly secure the governor 30 to the armature shaft 28.

The lower end of the casing 31 is provided with a centrally located opening 38. This opening 38 is defined by the lower peripheral edge of an inwardly extending annular flange 39 in the governor casing 31. The collar 40 has a centrally located threaded bore 41. The collar 40 includes an annular undercut shoulder 42 which is positioned on the annular flange 39 and is securely connected thereto by a plurality of screws 43.

A guide member or support 44 is adapted to be screwed into the threaded collar 40. The guide member includes a peripherally extending thread 45 and key holes 46. A vertical bore 47 extends centrally within the guide member 44. The key holes 46 may be engaged by a suitable wrench for threading the guide member 44 into the collar 40. The guide member 44 also includes a turned down or undercut portion 48 providing a spring seat 49. A spring 50 is seated upon the spring seat 49 and encircles the portion 48. The spring 50 has its upper end in engagement with a plunger head 51. The plunger head 51 is provided with an upper arcuate surface 52. The plunger head 51 is threaded to the upper end of a plunger or control rod 53. The plunger or rod 53 is adapted to reciprocate within the bore 47 of the guide member 44. A guide sleeve 56 is formed integrally with the plunger head 51 for reciprocation within the bore 47. The lower end of the plunger 53 includes a projection 57 which extends outwardly of the casing.

A pair of governor weights 58 are disposed at opposite sides of the plunger 53. The governor weights each include a narrow body 59 having a wedge shape or knife edge 60. Each knife edge 60 is disposed at the upper end of the body 59 and is adapted to pivot on a pivot member 61. Each pivot member 61 is disposed at opposite sides of the control rod 53 and is secured to the upper portion of the governor casing by means of the screws 34. The pivot members each include a recessed surface which serves as a fulcrum for the knife edge of each governor weight 58. The governor weights 58 are adapted to rock or pivot on their knife edges within these recessed fulcrums 62. A flexible element or band 63 is provided for retaining the governor weights 58 in pressing engagement with the recessed surface 62 of the pivot member 61. The flexible element 63 is provided with a central opening 63' through which the upper end of the plunger 53 extends. The flexible band 63 is connected to the plunger 53 and head 51 by means of a retaining washer 64 and nut 64' which are rigidly threaded onto the upper end of the plunger 53. The governor weights 58 are also each provided with an inwardly bent arcuate guide member 65. The arcuate guide members 65 are adapted to connect the lower portions of the flexible band 63 to the governor weights 58. The lower ends of the band 63 extend over the arcuate guide members 65 and are connected to the bodies 59 of the governor weights by means of rivets or other securing means 66. The spring 50 normally urges the plunger 53 upwardly. As the plunger 53 is urged upwardly, the head 51 also pushes the flexible band 63 upwardly, thus in turn pressing the governor weights 58 into engagement with the fulcrums 62. Inward movement of the governor weights 58 is limited by an annular shoulder 48' of the guide member 44. The term "upper" and "lower" are of course used in a descriptive sense only in view of the vertical position of the governor as illustrated. It is understood that the governor may be operated in other positions than the one shown.

It must be understood that the governing device may be utilized with any high-speed electric motor regardless of the machine with which the motor is utilized.

In operation the governor 30 is rotated by the armature shaft 28 of an electric motor (not shown). At a predetermined speed of rotation the governor weights 58 are pivoted outwardly. As the governor weights 58 are rocked outwardly, the rocking movement is such that the knife or wedge shaped pivot edges 60 are rocked within the recessed surfaces or fulcrums 62. As the governor weights are thus swung outwardly the flexible band 63 forces the plunger head 51 downwardly, the plunger head being in engagement with a suitable electrical control or switch (not shown) for shutting off the electrical current to the electric motor. This shutting off of the current is, of course, immediately effective to slow down the operation of the motor and the rotation of the shaft 28 whereupon the plunger is again moved out of engagement with the switch and the spring urges the plunger to its original position. Thus an effective governing action is maintained.

The governor is extremely sensitive and the arrangement of parts is such that accuracy and constant speed are maintained within a range of one per cent of the speed of rotation. Atmospheric changes do not in any way effect the operation of the governor and the novel design is such that lubrication and service are not necessary. The governor weights 58 are continually pressed into rocking engagement with the pivot member 61 by means of the flexible band 63. It may readily be appreciated that the knife edges 60 are such that a minimum amount of friction is present and therefore the element of friction need not be calculated in setting the governor to accomplish the particular speed control that is required. The governor weights 58 are sensitive to an ever increasing speed and are arranged to positively react to the minute variations which may occur in the operation of a high-speed electric motor. It can be seen, therefore, that the objects and purposes of the invention have been satisfactorily accomplished and that a novel mechanical governor has been provided which will provide a practical control for a high-speed electric motor. It must be understood that changes and modifications may be made which do not depart from the spirit of the invention as disclosed nor the scope thereof as defined in the appended claims.

What is claimed is:

1. In a speed governor having a casing adapted to be rotated by the drive shaft of an electric motor, an upwardly extending tubular support, a plunger arranged to reciprocate within said support, said plunger having a portion projecting outwardly from the casing, a resilient member connected to said plunger for normally urging the same vertically, inwardly directed arcuate members disposed on opposite sides of the plunger, governor weights disposed at opposite sides of the plunger, each weight including a relatively narrow body, the lower portion of said body being connected to an inwardly directed arcuate member, a relatively thin flexible band having a portion engaging the plunger and having its ends engaging the arcuate members for connection to the governor weights, said band being arranged to react against the resilient member of said plunger, a pivot member for each governor weight, each member having a recessed surface, a diverging edge portion adjacent the upper end of each governor weight, said edge portions engaging the recessed surfaces in rocking relation, said weights being arranged to pivot on the diverging edges upon rotation of said casing whereby the lower ends of said weights are swung outwardly and said plunger is reciprocated.

2. In a speed governor having a rotatable casing adapted to be rotated by the drive shaft of a power unit, a plunger adapted to be reciprocated within said casing, governor weights disposed on opposite sides of the plunger, each governor weight having a narrow body, including at one end a wedge shaped pivot edge, a flexible generally U-shaped band in engagement with the plunger, the band having end portions thereof disposed on opposite sides of said plunger and extending in a first direction, means connecting the end portions of the band to the narrow body of the governor weights at an opposite end with respect to the wedge shaped pivot edge, said weights extending angularly in a second direction opposite to the direction of extension of said end portions of the band, a pivot member for each weight supported on the casing, each pivot member including a recess, and a resilient member arranged to urge the plunger in a third direction thereby urging the weights bodily in the same direction as said third direction and the pivot edges in engagement with the recesses of the pivot members for rocking contact therewith, the governor weights being swingable outwardly during rotation of said casing whereby said plunger is moved in a fourth direction opposite to said third direction.

OTTO E. HINTZ.
HOWARD A. HECKENDORF.

REFERENCES CITED

The following references are of record in the file of this patent:

UNITED STATES PATENTS

| Number | Name | Date |
|---|---|---|
| 1,190,593 | Russell | July 11, 1916 |
| 2,099,050 | Chamberlain | Nov. 16, 1937 |
| 2,141,772 | Stadler | Dec. 27, 1938 |
| 2,341,624 | Kieser | Feb. 15, 1944 |
| 2,392,265 | Ricardo | Jan. 1, 1946 |
| 2,416,973 | Wright | Mar. 4, 1947 |

FOREIGN PATENTS

| Number | Country | Date |
|---|---|---|
| 305,360 | Germany | May 1, 1918 |